(12) United States Patent
Shen et al.

(10) Patent No.: US 7,576,620 B2
(45) Date of Patent: Aug. 18, 2009

(54) PSEUDO RANDOM CLOCK GENERATOR

(75) Inventors: Yi-Lun Shen, Hsinchu (TW); Da-Chun Wei, Hsinchu (TW)

(73) Assignee: Leadtrend Technology Corp., Hsin-Chu (TW)

(*) Notice: Subject to any disclaimer, the term of this patent is extended or adjusted under 35 U.S.C. 154(b) by 69 days.

(21) Appl. No.: 11/777,567

(22) Filed: Jul. 13, 2007

(65) Prior Publication Data

US 2009/0016413 A1    Jan. 15, 2009

(51) Int. Cl.
  *H03B 29/00* (2006.01)
  *H03K 3/84* (2006.01)
  *G06F 7/58* (2006.01)
(52) U.S. Cl. .................. 331/78; 708/252; 327/164
(58) Field of Classification Search .................. 331/78; 327/164; 708/250–252
  See application file for complete search history.

(56) References Cited

U.S. PATENT DOCUMENTS

| | | | | |
|---|---|---|---|---|
| 3,681,708 A | * | 8/1972 | Olmstead | 331/78 |
| 4,291,386 A | * | 9/1981 | Bass | 708/252 |
| 4,348,597 A | * | 9/1982 | Weber | 327/243 |
| 4,438,501 A | * | 3/1984 | Weber | 708/250 |
| 6,961,403 B1 | * | 11/2005 | Austin et al. | 377/80 |
| 7,236,594 B2 | * | 6/2007 | Van Veldhoven et al. | 380/46 |
| 2004/0123199 A1 | * | 6/2004 | Tan | 714/728 |

\* cited by examiner

*Primary Examiner*—Robert Pascal
*Assistant Examiner*—Levi Gannon
(74) *Attorney, Agent, or Firm*—Winston Hsu (57) ABSTRACT

A pseudo random clock generator includes a clock generator for generating a clock signal. A pseudo random code generator receives the clock signal and thereby generating a pseudo random code. A code limiter enables the value of the pseudo random code being unchanged for at least two periods of the clock signal. A logic gate applies a logic operation to the pseudo random code and the clock signal and thereby outputting a pseudo random clock.

15 Claims, 13 Drawing Sheets

PSEUDO RANDOM CLOCK GENERATOR

BACKGROUND

1. Technology Field

The present invention relates to a clock generator. More particularly, the present invention relates to a pseudo random clock generator having a code limiter.

2. Related Art

Due to increases in the speed at which digital circuits operate, clock circuits that generate reference clocks for digital circuits have to operate at higher frequencies, for example in the 100 MHz range. An artifact of higher frequency clocks circuits is that electromagnetic interference (EMI) emissions as a result of clock signal transmissions can significantly exceed the level of thermal noise.

One technique to reduce the EMI emissions when transmitting a clock signal is to spread the clock frequency by modulation of the clock period, which is known as Spread spectrum clocking (SSC) technique. This technique is known as spread spectrum clocking. The spread is about 0.25-1.5% of the center frequency, and helps to reduce the peak of the emission at the center of frequency. However, the spread spectrum clock still emits electromagnetic interference.

Figure 1:
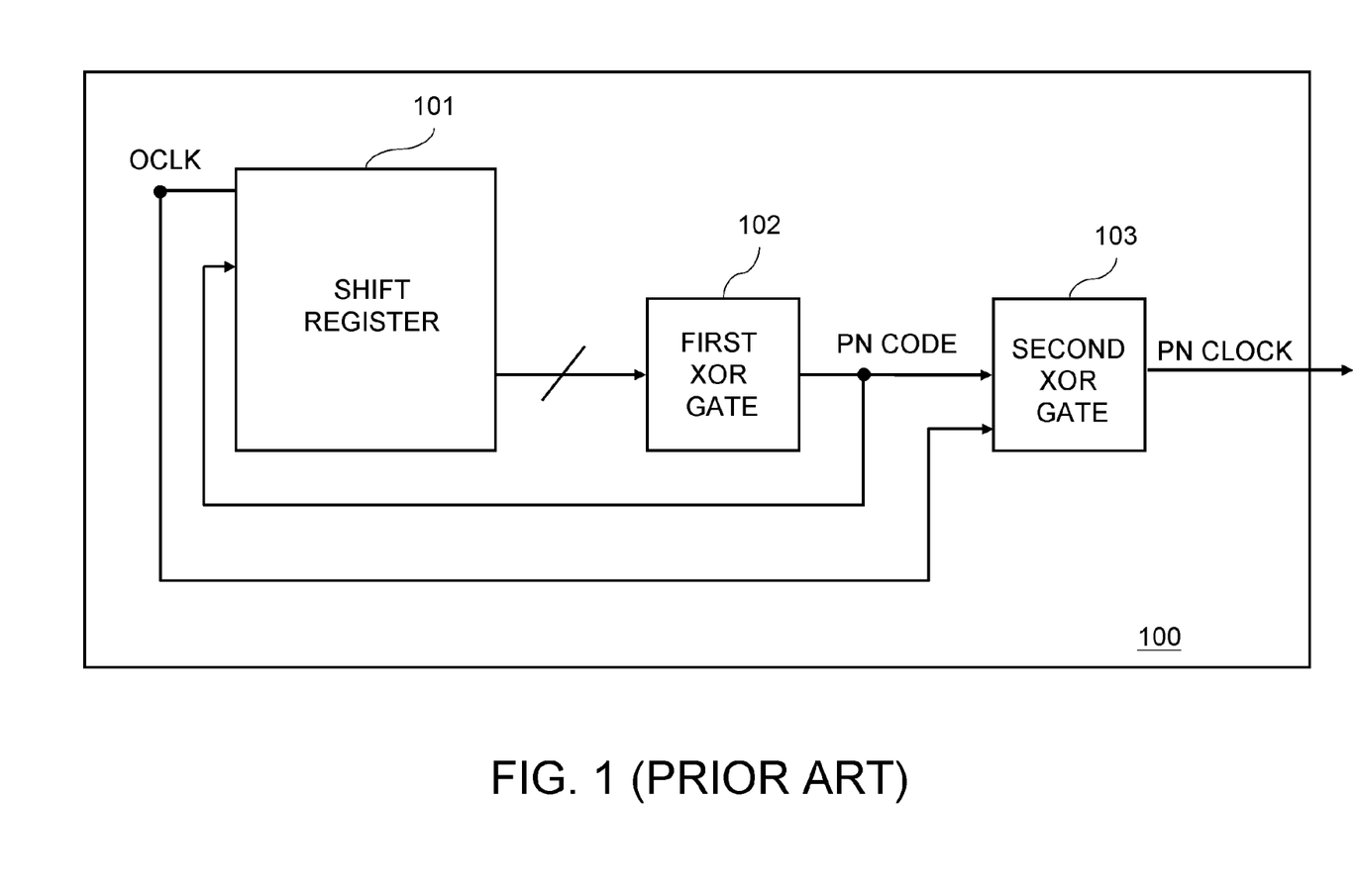
FIG. 1 illustrates a Pseudo random (PN) generator of the prior art.

FIG. 1 illustrates a pseudo random (PN) generator that spreads the clock over a wide spectrum. The generator 100 includes a shift register 101, a first XOR gate 102 and a second XOR gate 103. The shift register 101 is a 10-bit shift register. The shift register 101 receives a clock signal OCLK and the feedback signal from the first XOR gate 102 and delivers the output signal to the first XOR gate 102 such that the first XOR gate 102 outputs a pseudo random code PN. The second XOR gate 103 receives the pseudo random code PN and the clock signal OCLK, and outputs a pseudo random clock having the similar frequency as that of the clock signal OCLK accordingly.

Figure 2:
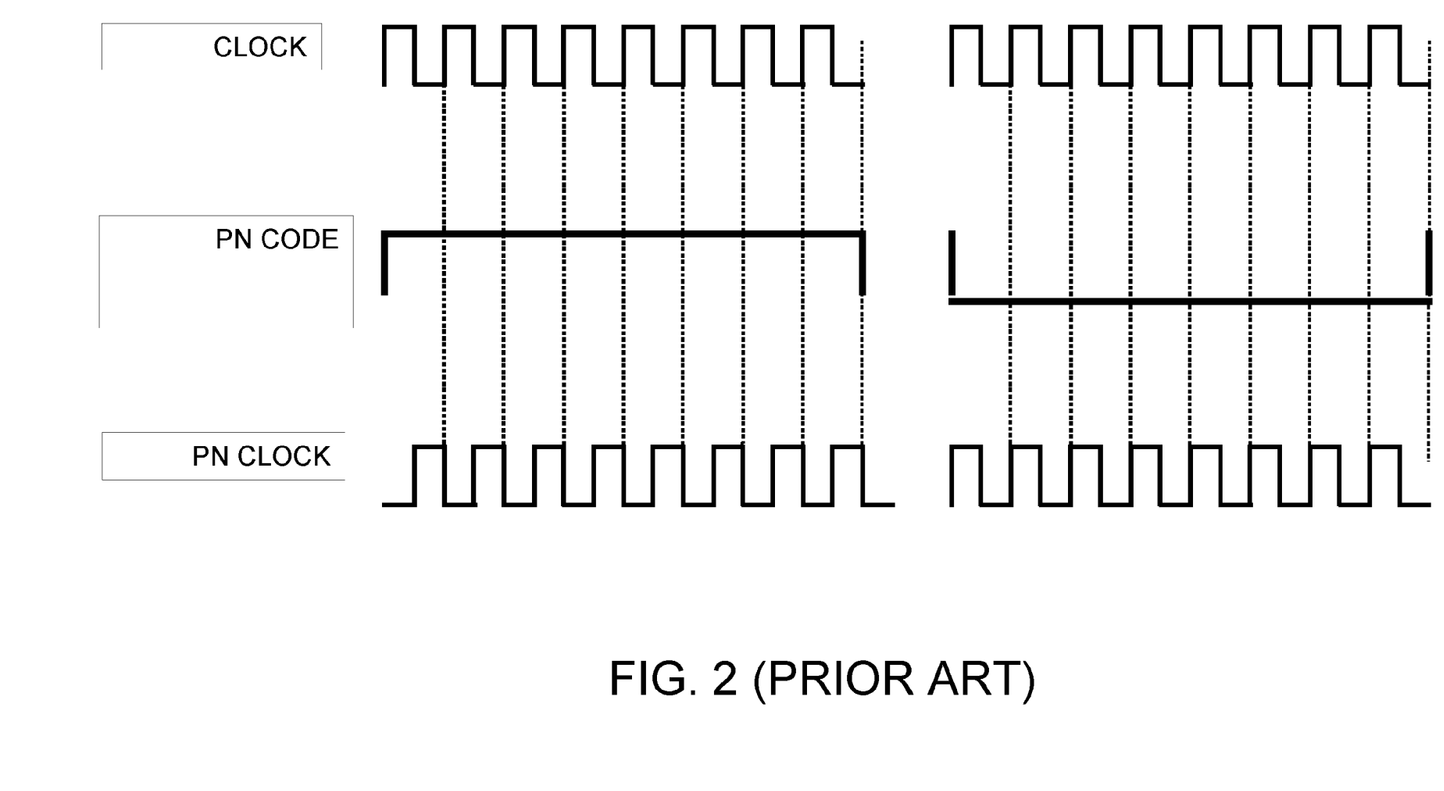
FIG. 2 illustrates the timing chart of the Pseudo random generator of FIG. 1.
Figure 3:
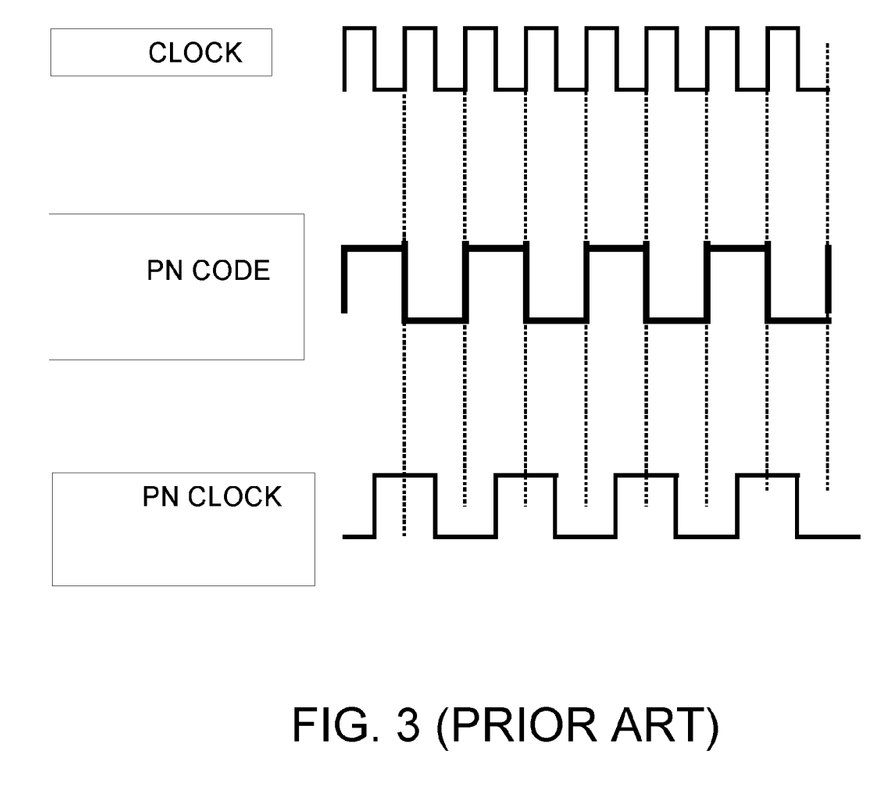
FIG. 3 illustrates the timing chart of the Pseudo random generator of FIG. 1.
Figure 4:
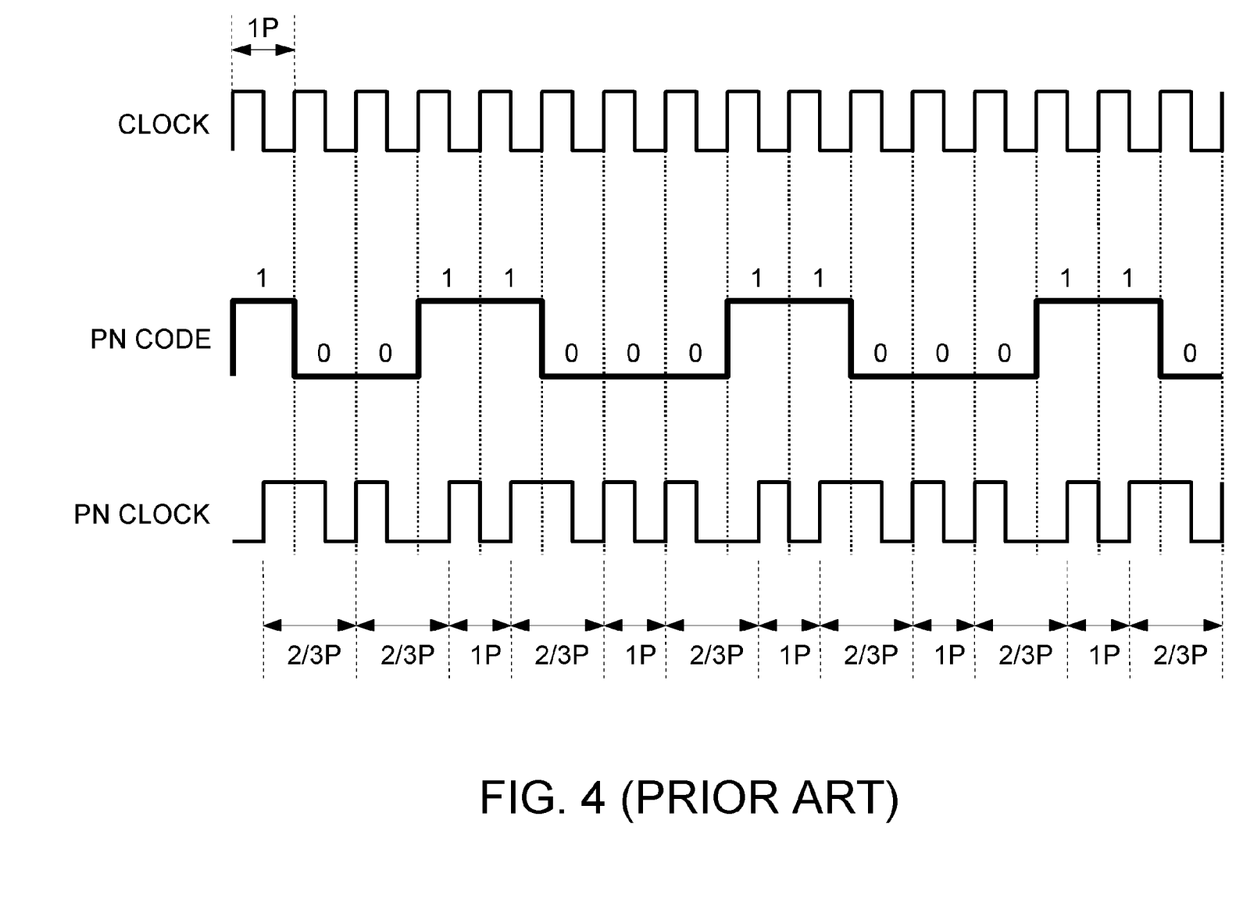
FIG. 4 illustrates the timing chart of the Pseudo random generator of FIG. 1.

FIG. 2 to FIG. 4 illustrate the timing charts of the pseudo random generator of FIG. 1. In FIG. 2, the frequency of the pseudo random clock is the same as that of the original frequency. In FIG. 3, the frequency of the pseudo random clock is half of the original frequency. In FIG. 4, the frequency of the pseudo random clock is ⅔ of the original frequency. It is noted that the frequency of pseudo random clock is affected by the pseudo random code since the pseudo random clock is the exclusive OR operation result of the pseudo random code and the original clock.

Figure 5:
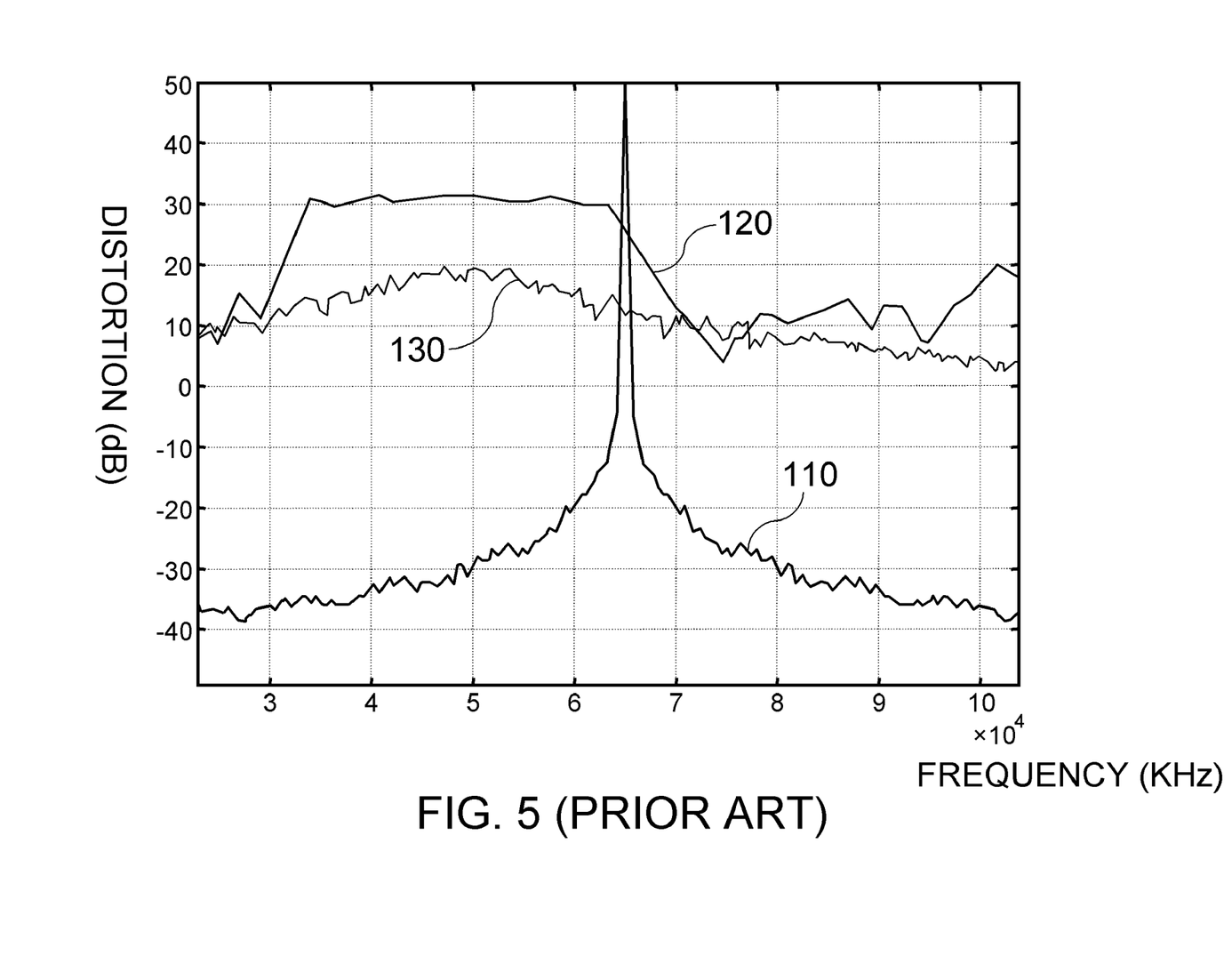
FIG. 5 is Fast Fourier Transform (FFT) simulation of the circuitry of FIG. 1.

FIG. 5 is Fast Fourier Transform (FFT) simulation of the circuitry of FIG. 1. The curve 110 represents a clock in form of sine wave. The curve 120 represents the spread-spectrum signal by way of conventional art. The curve 130 represents the spread-spectrum signal by way of the circuitry in FIG. 1. The result shows 30.19 dB reduction in peak power-density that is better than analog circuit implementation. The frequency of the spread-spectrum clock is ½ to 1 time of the original clock. It is noted that the wide spread spectrum may restrain the power density; however, the spread spectrum bandwidth is somewhat broad.

Even though the prior art in FIG. 1 may reduce the EMI emissions, the large spread bandwidth has influence on the AC to DC system, like noisy power, or lower switching frequency, etc. This leads to difficulty to design parameters in a power system. Even though a digital to analogs converter may by employed to limit the frequency range, the material cost is also considerable.

SUMMARY

Accordingly, a pseudo random (PN) clock generator is disclosed in the embodiment of the invention.

According to an embodiment of the present invention, as embedded and broadly described, the pseudo random clock generator includes a clock generator for generating a clock signal; a pseudo random code generator for receiving the clock signal and thereby generating a pseudo random code; a code limiter for enabling the value of the pseudo random code being unchanged for at least two periods of the clock signal; and a logic gate for applying a logic operation to the pseudo random code and the clock signal and thereby outputting a pseudo random clock.

In one embodiment, the clock generator further receives the pseudo random code. Therefore, only one oscillator is required such that a maximum duty cycle is maintained.

In one embodiment, the pseudo random clock generator is further configured with a delayer for receiving the pseudo random code and delivering a delayed pseudo random code to the clock generator. The delayer is configured to eliminate the odd harmonic distortion caused by the corelation of the clock signal and the pseudo random clock.

In the embodiment, the simple and digitalized circuitry enables the frequency range being controllable. Further, only one oscillator is included and a digital to analog converter is not necessary such that the material cost is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 6:
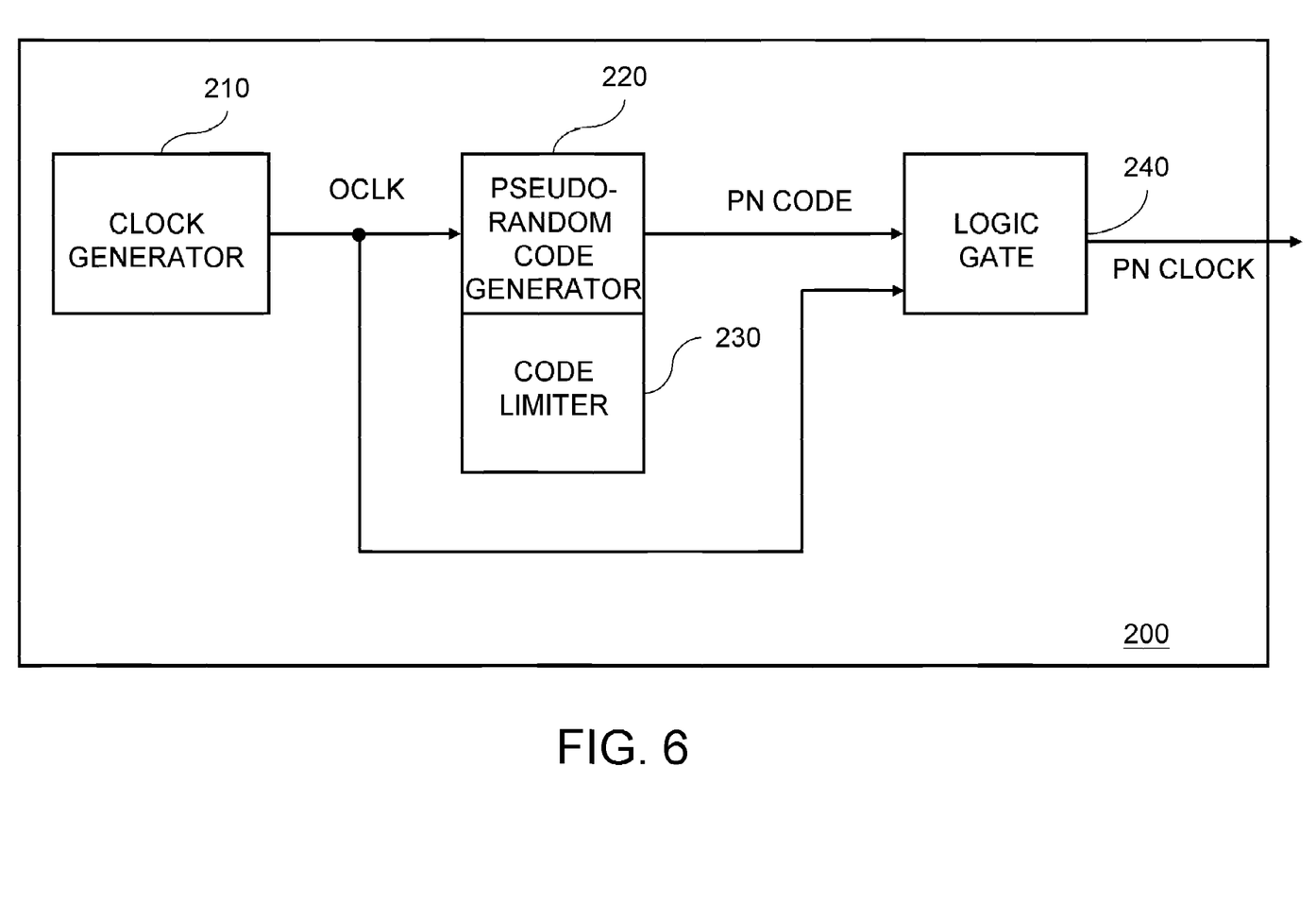
FIG. 6 illustrates the block diagram of the pseudo random (PN) clock generator according the embodiment.

Refer to FIG. 6 illustrating the block diagram of the pseudo random (PN) clock generator according the embodiment. The PN clock generator 200 includes a clock generator 210 for generating a clock signal OCLK with a first frequency. The pseudo random code generator 220 electrically connected to the clock generator 210 receives the clock signal OCLK and thereby generates pseudo random code. The code limiter 230 connected to the PN code generator 220 enables the value of the pseudo random code being unchanged for at least two periods of the clock signal. The logic gate 240, which is preferably but not limited to a XOR logic gate, receives the PN code and the clock signal OCLK and performs a logic operation to the PN code and the clock signal such that a pseudo random clock is generated. The logic gate 240, which is a XOR logic gate, performs a logic exclusive OR operation to the PN code and the clock signal OCLK.

Figure 7:
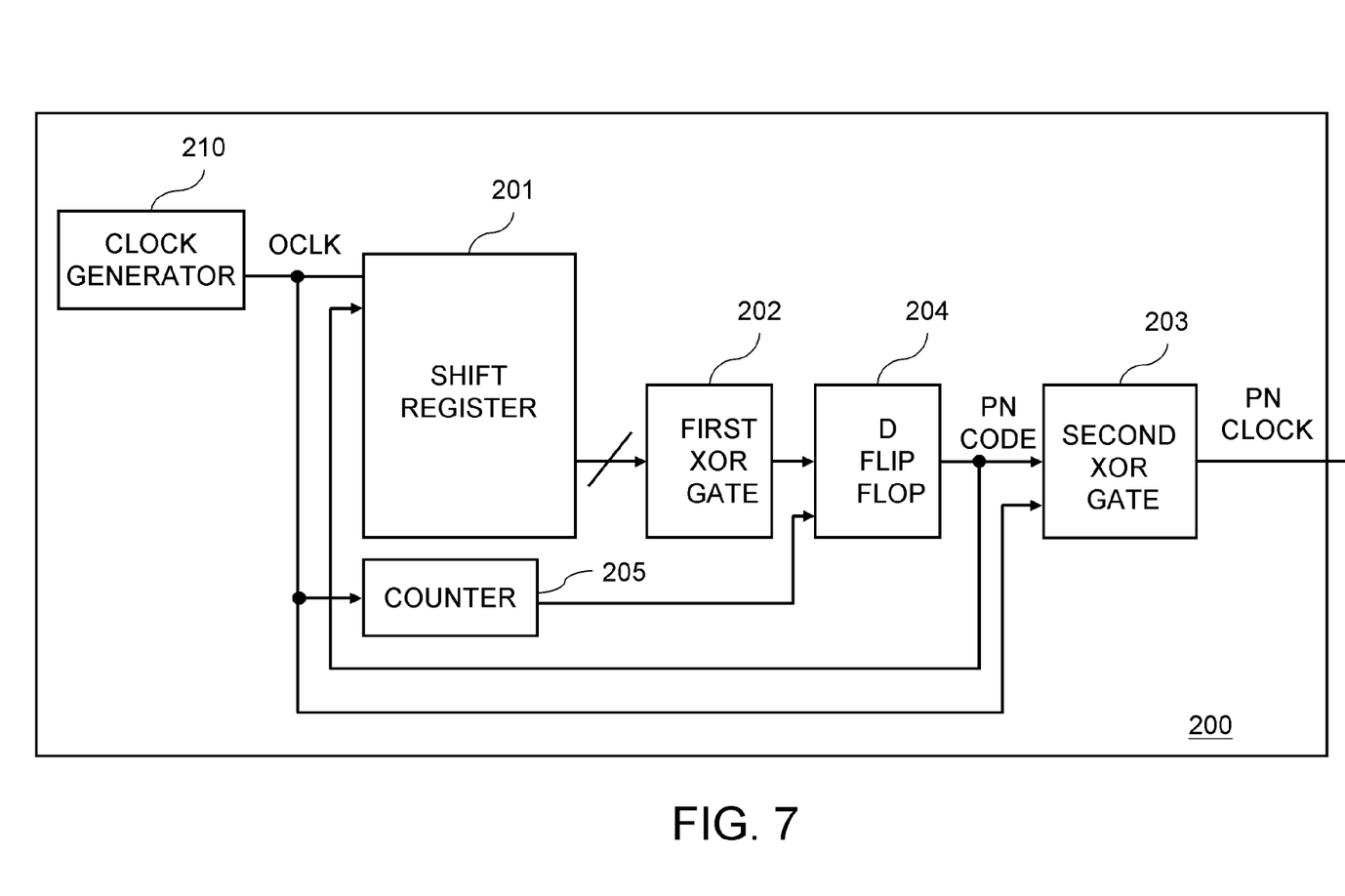
FIG. 7 illustrates the schematic circuitry of the pseudo random clock generator according the embodiment.

FIG. 7 illustrates the schematic circuitry of the pseudo random clock generator according the embodiment. The PN clock generator 200 includes a clock generator 210, a shift register 201, a first XOR gate 202, a second XOR gate 203, a D flip flop 204 and a counter 205.

The shift register 201 is a shift register with more than one bit. In one embodiment, the shift register 201 is a, but not limited to, 10-bit shift register. The counter 205 is but not limited to a frequency divider. In the embodiment, a 3-division or a 2-division frequency divider is employed.

The shift register 201, electrically connected to the clock generator 210, receives the clock signal OCLK. The first XOR gate 202 receives the output signal from the shift register 201 and delivers a first logic result to the D flip flop 204. The D flip flop 204 receives a frequency-divided signal from the counter 205 and the first logic result from the first XOR gate 202, and delivers a PN code accordingly. The second XOR 203 gate applies a logic exclusive OR operation to the PN code and the clock signal OCLK to generate pseudo random clock having a second frequency. The first XOR gate 202 and the second XOR gate 203 are for illustration. Any circuitry that may perform exclusive OR operation is an alternative.

In this embodiment, the D flip flop 204 and the counter 205 form a code limiter for limiting the PN code generated by the first XOR gate 202. The code limiter having the D flip flop 204 and the counter 205 enables the value of the pseudo random code to repeat at least two or three periods of the clock signal.

Figure 8:
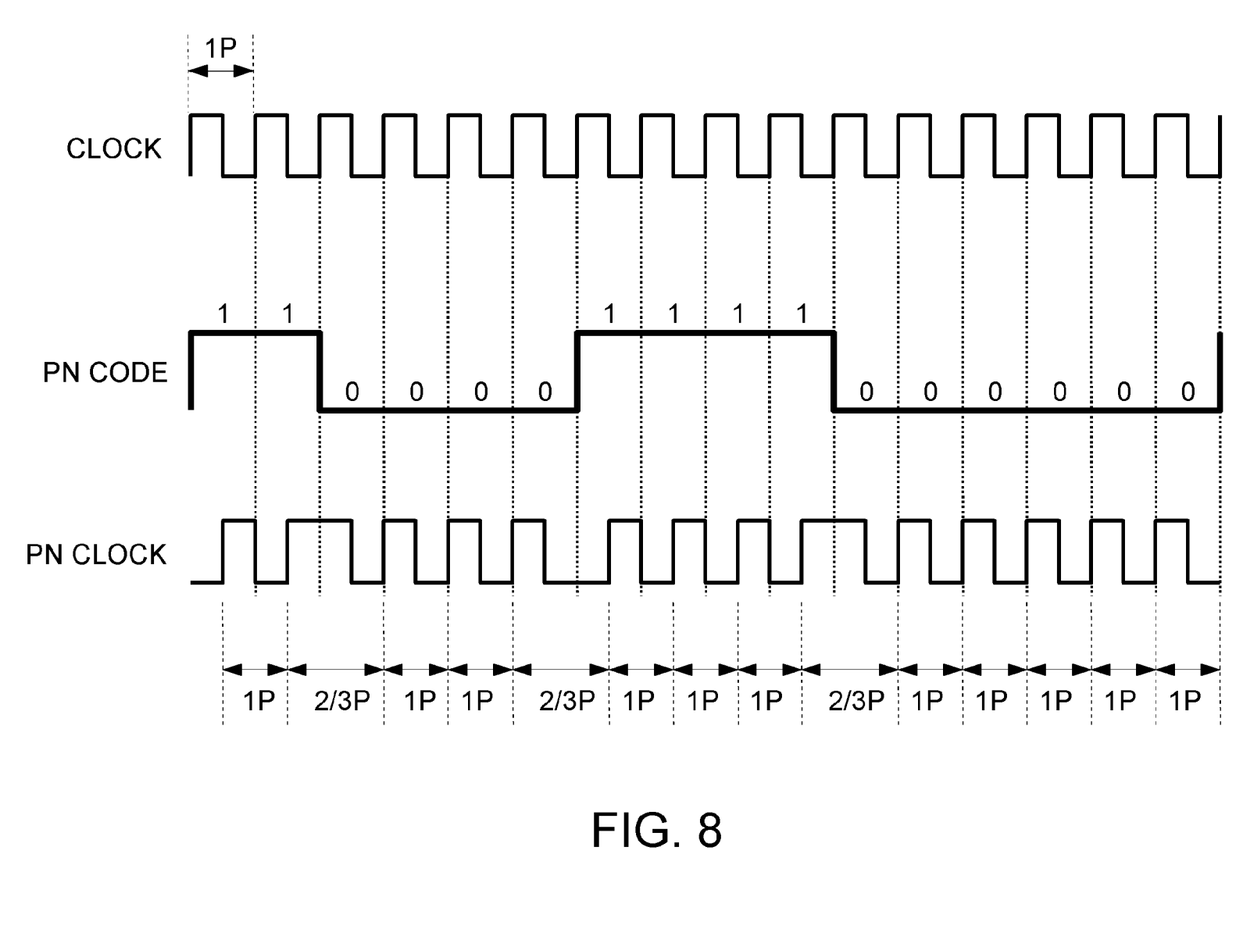
FIG. 8 illustrates the timing chart of the Pseudo random generator of FIG. 7.

Refer to FIG. 8 illustrating the timing chart of the clock generator in FIG. 7. The frequency of the pseudo random code is half of that in FIG. 4. If the frequency of the clock signal is divided by 2, i.e., a 2-dividion frequency divider is selected, it is noted that the occurrence of the clock of the $2/3$-period is less than that in the prior art, comparing with FIG. 8 and FIG. 4. Therefore, after the exclusive OR operation, the PN clock is at least $2/3$ to 1 time of the clock signal. Thus, though the code limiter, the bandwidth of the spectrum is reduced.

Figure 9:
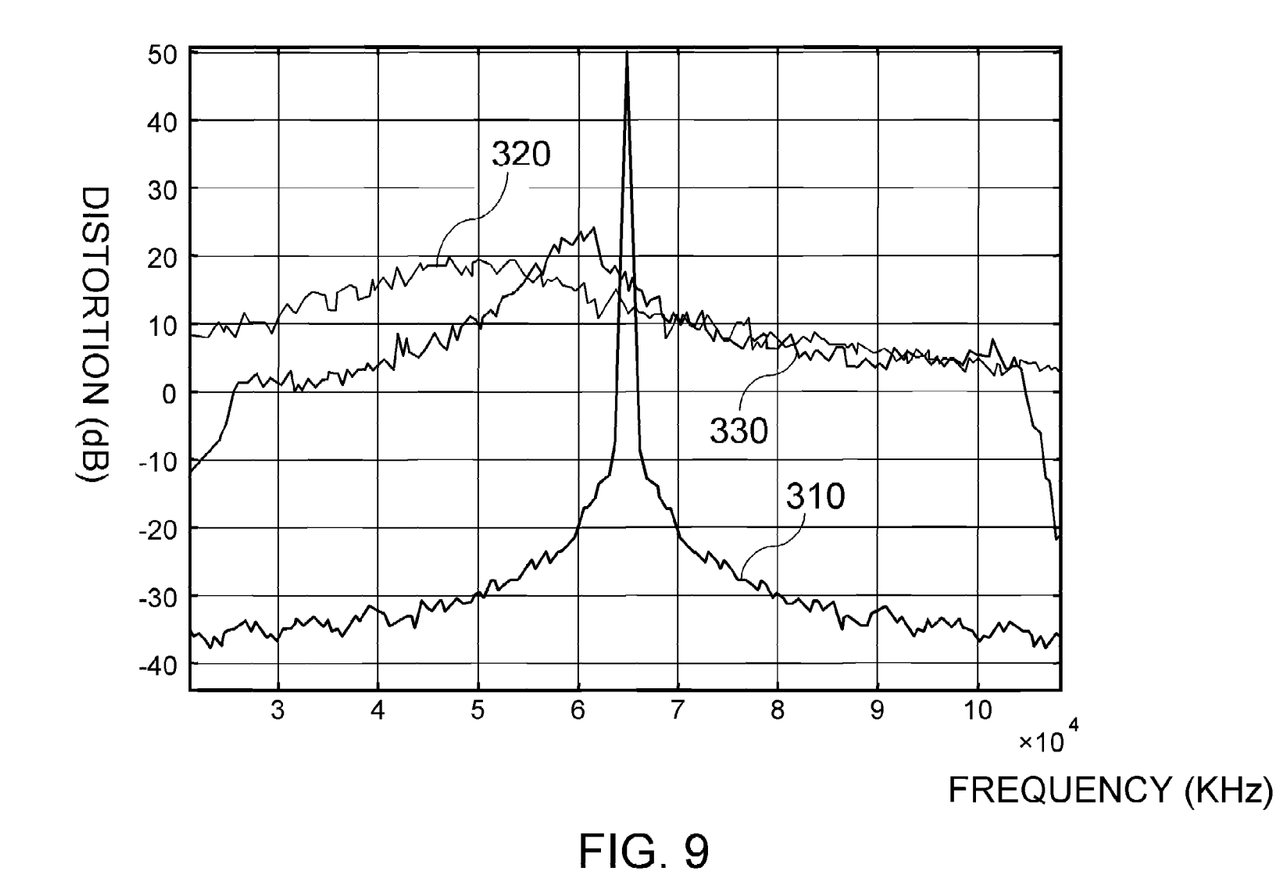
FIG. 9 is Fast Fourier Transform (FFT) simulation of the circuitry of FIG. 7.

FIG. 9 is Fast Fourier Transform (FFT) simulation of the circuitry of FIG. 7. The curve 310 represents a clock in form of sine wave. The curve 320 represents the spread-spectrum signal without a code limiter. The curve 330 represents the spread-spectrum signal by way of the circuitry in FIG. 7 having a code limiter. It is noted that the spread-spectrum is modified to be more centralized.

Figure 10:
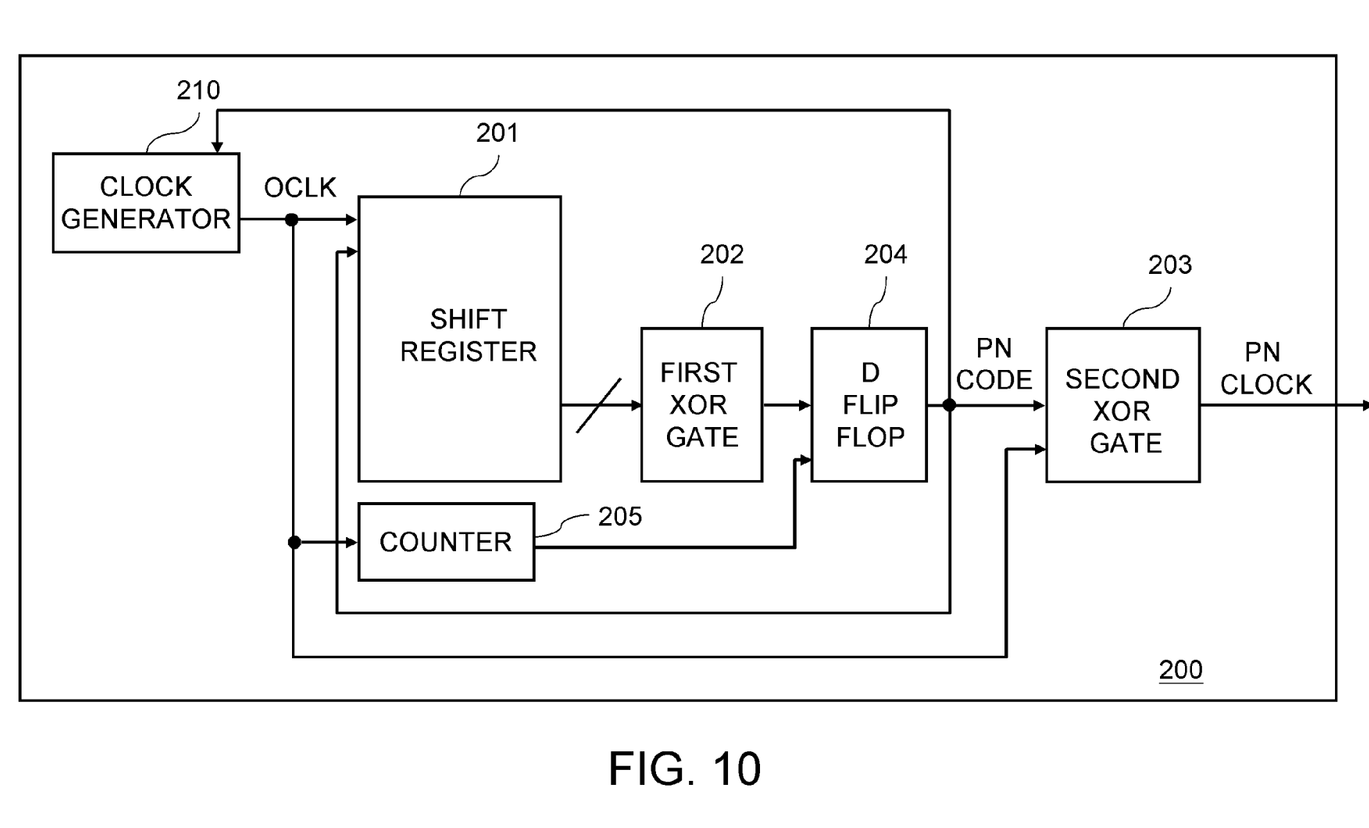
FIG. 10 illustrates another schematic circuitry of the pseudo random clock generator according the embodiment.

Refer to FIG. 10 illustrating another block diagram of the pseudo random (PN) clock generator. The PN clock disclosed in FIG. 10 is used in the case of the duty cycle which is not 50%. The main composition and operation is similar to the embodiment shown in FIG. 5. However, in this embodiment, the pseudo random code PN generated from the D flip flop 204 is feedback to the clock generator 210.

Figure 11:
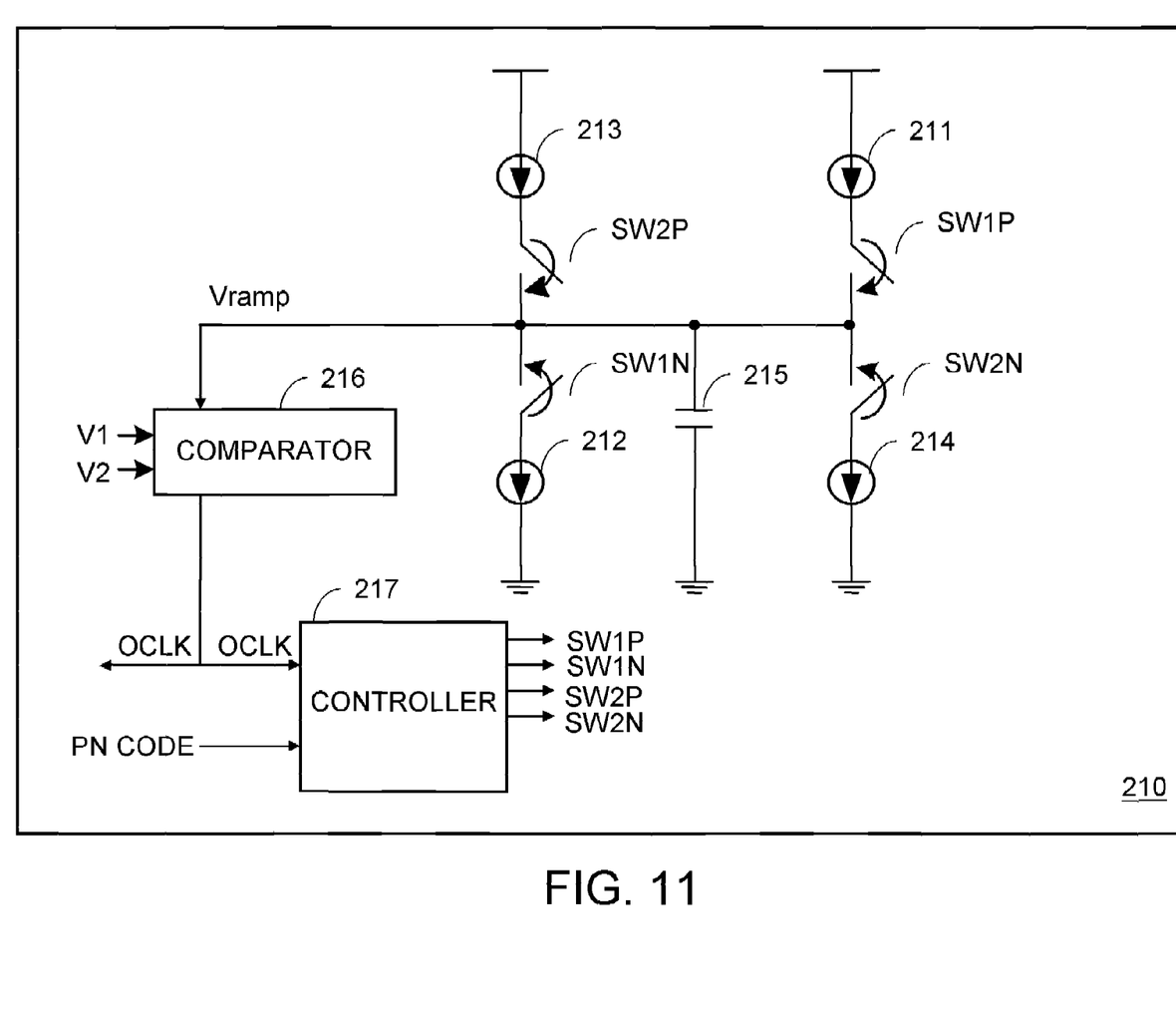
FIG. 11 illustrates the schematic circuitry of the clock generator in FIG. 10.

FIG. 11 illustrates the schematic circuitry of the clock generator in FIG. 10. The clock generator includes charge circuits and discharge circuits for generating a clock signal whose duty cycle is not 50%.

A capacitor 215 is configured in the clock generator 210. The comparator 216 compares the voltage Vramp of the capacitor 215 with one of a first reference voltage V1 and a second reference voltage V2 to output the clock signal OCLK.

The first charge path having a first current source 211 and a first switch SW1P connected in series charges the capacitor 215. The first discharge path having a second current source 212 and a second switch SW1N connected in series discharges the capacitor 215. The second charge path having a third current source 213 and a third switch SW2P connected in series charges the capacitor 215. The second discharge path having a fourth current source 214 and a fourth switch SW2N connected in series discharge the capacitor 215.

The controller 217 controls the first switch SW1P, the second switch SW1N, the third switch SW2$p$ and the fourth switch SW2N in response to the clock signal OCLK from the comparator 216 and the pseudo random code.

Though controlling the charge paths and the discharges paths, the capacitor 215 is charged and discharged periodically.

When the voltage level of the pseudo random code is low and the voltage level of the clock signal is high, the controller 217 controls the first charge path to charge the capacitor 215 to the second reference voltage V2. The voltage Vramp of the capacitor 215 increases from the first reference voltage V1 to the second reference voltage V2. When the voltage level of the pseudo random code is low and the voltage level of the clock signal is low, the controller 217 controls the first discharge path to discharge the capacitor 215 to the first reference voltage V1. The voltage Vramp of the capacitor 215 decreases from the second reference voltage V2 to the first reference voltage V1. It is noted that the voltage Vramp of the capacitor 215 presents a triangle form. Under the condition of the voltage level of the PN code being low, the current value of the second current 212 is configured to be larger than that of the first current source 211 such that the charge rate is slower than the discharge rate. Thus, the duty cycle of the clock signal is larger then 50%.

When the voltage level of the pseudo random code is high and the voltage level of the clock signal is high, the controller 217 controls the second charge path to charge the capacitor 215 to the second reference voltage V2. The voltage Vramp of the capacitor 215 increases from the first reference voltage V1 to the second reference voltage V2. When the voltage level of the pseudo random code is high and the voltage level of the clock signal is low, the controller 217 controls the second discharge path to discharge the capacitor 215 to the first reference voltage V1. The voltage Vramp of the capacitor 215 decreases from the second reference voltage V2 to the first reference voltage V1.

It is noted that the voltage Vramp of the capacitor 215 also presents a mirror triangle form of the one set forth. Under the condition of the voltage level of the PN code being high, the current value of the third current 213 is configured to be larger than that of the fourth current source 214 such that the charge rate is faster than the discharge rate. Thus, the duty cycle of the clock signal is lower then 50%. In one embodiment, the current value of the first current source 211 is the same as that of the fourth current source 214. The current value of the third current source 213 is the same as that of the second current source 212.

Through the charge paths and the discharge paths, the clock signal OCLK is generated with a duty cycle larger then 50% and a duty cycle lower then 50%. The PN clock is generated by performing an exclusive OR operation to the PN code and the clock signal OCLK. Thus, the duty cycle of the clock signal OCLK is larger than 50%.

A capacitor having value of 15 pf as the capacitor 215 is given. The current value of the first current source and that of the fourth current source is selected as 1.4 µA, while the current value of the second current source and that of the third current source is selected as 4.2 µA.

Figure 12:
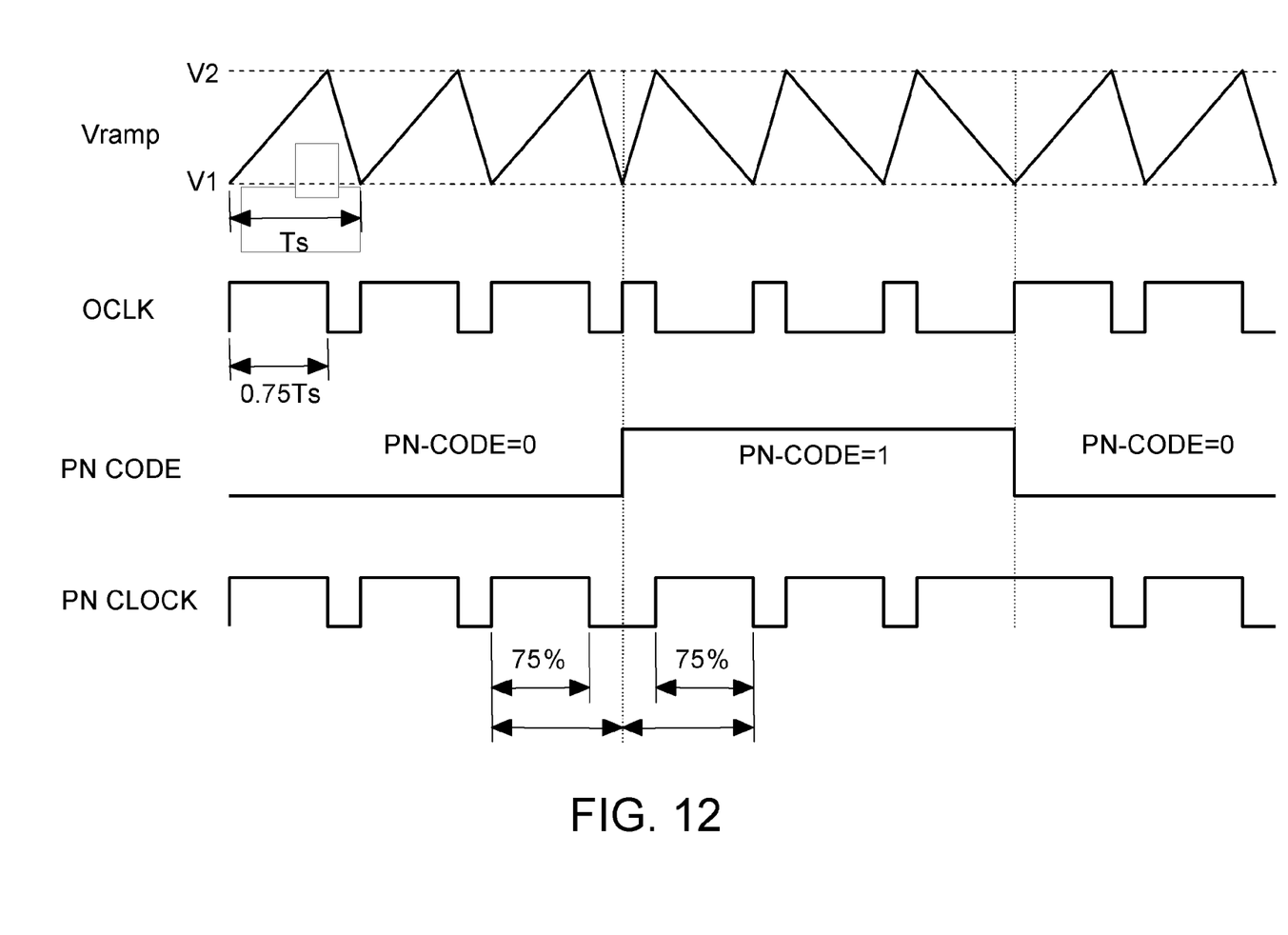
FIG. 12 illustrates the timing chart of the Pseudo random generator of FIG. 7.

In this embodiment, a clock signal having a duty cycle 75% is taken for illustration. By applying the equation of CV=IT, where C is the value of the capacitor, and I is the value of the current source, T=15 pf×1V/4.2 µA+15 pf×1V/1.4 µA=14.285 µs. The frequency is thus close to 70 KHz. A duty cycle of 75% is generated. In FIG. 12, when the pseudo random code is logic 0, the pseudo random clock is the same as the clock signal OCLK. When the pseudo random code is logic 1, the logic value of the pseudo random clock is inverse of that of the clock signal. Thus, when the pseudo random code is logic 1, the duty cycle is 75%; while the pseudo random code is logic 0, the duty cycle is also 75%. The duty cycle may maintain the same under different pseudo random codes. Otherwise, the duty cycle when the pseudo random code is logic 1 will be 25%.

Figure 13:
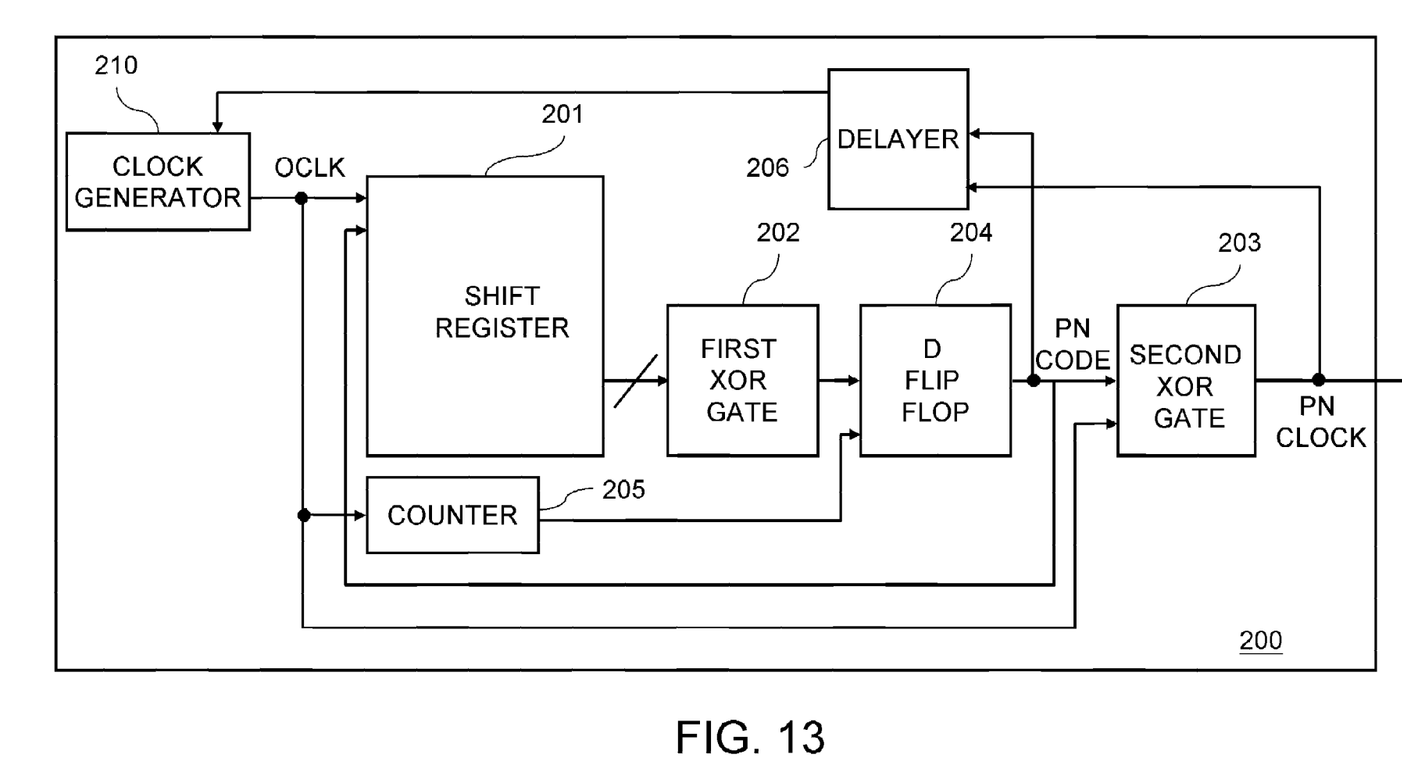
FIG. 13 illustrates another schematic circuitry of the pseudo random clock generator according the embodiment.

Refer to FIG. 13 illustrating another block diagram of the pseudo random (PN) clock generator. The main composition and operation is similar to the embodiment shown in FIG. 7. However, in this embodiment, the pseudo random code PN generated from the D flip flop 204 is sent a delayer 206. The delayer 206, which is connected to the clock generator 210, issues a delayed PN code to the clock generator 210. The delayer 206 may be but not limited to a D flip flop having the clock terminal connected to the second XOR gate 203. The delayer 206 is used for eliminating the odd harmonic waves which is caused by the corelation of the clock signal and the pseudo random clock.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pseudo random clock generator, comprising:
   a clock generator generating a clock signal;
   a pseudo random code generator receiving the clock signal and thereby generating a pseudo random code;
   a code limiter enabling the value of the pseudo random code to be unchanged for at least two periods of the clock signal; and
   a logic gate applying a logic operation to the pseudo random code and the clock signal and thereby outputting a pseudo random clock.

2. The generator of claim 1, wherein the pseudo random code generator comprises a shift register and a first XOR gate connected to the shift register for delivering a first logic result.

3. The generator of claim 2, wherein the code limiter comprises a counter for receiving the clock signal and delivering a second clock signal; and a D flip flop connected to the counter and the first XOR gate for receiving the second clock signal and the first logic result thereby generating the pseudo random code.

4. The generator of claim 3, wherein the counter is a frequency divider.

5. The generator of claim 1, wherein the pseudo random code is fed back to the clock generator.

6. A pseudo random clock generator, comprising:
   a clock generator generating a clock signal;
   a pseudo random code generator receiving the clock signal and thereby generating a pseudo random code, wherein the pseudo random code is fed back to the clock generator;
   a code limiter enabling the value of the pseudo random code to be unchanged for at least two periods of the clock signal; and
   a logic gate applying a logic operation to the pseudo random code and the clock signal and thereby outputting a pseudo random clock.

7. The generator of claim 6, wherein the pseudo random code generator comprises a shift register and a first XOR gate connected to the shift register for delivering a first logic result.

8. The generator of claim 6, wherein the code limiter comprises a counter for receiving the clock signal and delivering a second clock signal; and a D flip flop connected to the counter and the first XOR gate for receiving the second clock signal and the first logic result thereby generating the pseudo random code.

9. The generator of claim 8, wherein the counter is a frequency divider.

10. The generator of claim 6, wherein the clock generator comprises:
    a capacitor;
    a first charge path, having a first current source and a first switch connected in series, for charging the capacitor;
    a first discharge path, having a second current source and a second switch connected in series, for discharging the capacitor;
    a second charge path, having a third current source and a third switch connected in series, for charging the capacitor;
    a second discharge path, having a fourth current source and a fourth switch connected in series, for discharging the capacitor;

a comparator for comparing the voltage of the capacitor with one of a first reference voltage and a second reference voltage to output the clock signal; and a controller for controlling the first switch, the second switch, the third switch and the fourth switch in response to the clock signal from the comparator and the pseudo random code.

11. The generator of claim 10, wherein under the condition of the voltage level of the pseudo random code is low, the current value of the second current source is configured to be larger than that of the first current source such that the charge rate for the first current source charging the capacitor is slower than the discharge rate for the second current source discharging the capacitor.

12. The generator of claim 11, wherein the current value of the first current source is smaller than that of the second current source.

13. The generator of claim 10, wherein under the condition of the voltage level of the pseudo random code being high, the current value of the third current source is configured to be larger than that of the fourth current source such that the charge rate for the third current source charging the capacitor is faster than the discharge rate for the fourth current source discharging the capacitor.

14. The generator of claim 13, wherein the current value of the fourth current source is smaller than that of the third current source.

15. The generator of claim 6, further comprising a delayer for receiving the pseudo random code and delivering a delayed pseudo random code to the clock generator.

* * * * *